United States Patent [19]

Looks

[11] 4,196,673
[45] * Apr. 8, 1980

[54] COUPLING DEVICE FOR CONTAINERS

[75] Inventor: Arnold Looks, Bremen, Fed. Rep. of Germany

[73] Assignee: Conver Ingenieur-Technik GmbH & Co. KG, Bremen, Fed. Rep. of Germany

[*] Notice: The portion of the term of this patent subsequent to Apr. 4, 1995, has been disclaimed.

[21] Appl. No.: 870,243

[22] Filed: Jan. 17, 1978

Related U.S. Application Data

[62] Division of Ser. No. 709,014, Jul. 27, 1976, Pat. No. 4,082,052.

[30] Foreign Application Priority Data

Sep. 6, 1975 [DE] Fed. Rep. of Germany ....... 2539741
Sep. 13, 1975 [DE] Fed. Rep. of Germany ... 7529092[U]

[51] Int. Cl.² ............................................. B61D 45/00
[52] U.S. Cl. .................................. 410/89; 24/81 E; 114/75; 280/DIG. 8; 296/35.1
[58] Field of Search ............. 114/72, 75; 214/10.5 R, 214/10.5 S; 105/366 R, 366 A, 366 B, 463, 464, 465; 220/23.6, 23.4; 280/DIG. 8; 24/81 E; 296/35 A

[56] References Cited

U.S. PATENT DOCUMENTS

| | | | |
|---|---|---|---|
| 3,456,967 | 7/1969 | Tantlinger | 296/35 A X |
| 4,082,052 | 4/1978 | Looks | 214/10.5 S X |

*Primary Examiner*—Sherman D. Basinger
*Attorney, Agent, or Firm*—Sughrue, Rothwell, Mion, Zinn and Macpeak

[57] ABSTRACT

A coupling device for detachably connecting of one container fitting to another or a container fitting to a ship's deck by way of a slot within the container fitting, employs a casing for abutment with the container fitting, a locking pin having at least at one end an integral hammerhead bolt with said casing including a longitudinal opening for rotatively carrying the bolt. The opening constitutes a continuous aperture, and the aperture is so disposed and has a cross-section relative to the bolt such that the bolt can be introduced therethrough to achieve assembly, rotated approximately 180° and then subsequent rotation limited to permit the bolt to rotate between extreme operating positions which effectively lock the fitting to the device or release the fitting but prevent the bolt from passing through the casing aperture.

7 Claims, 9 Drawing Figures

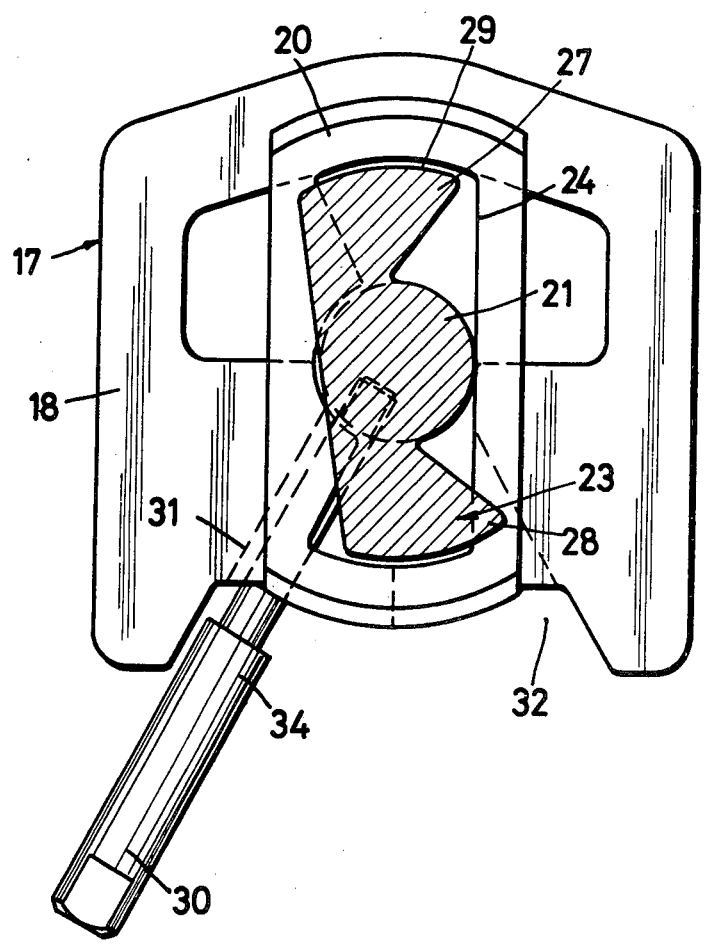

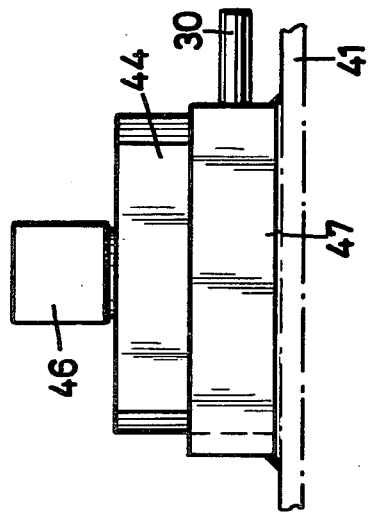
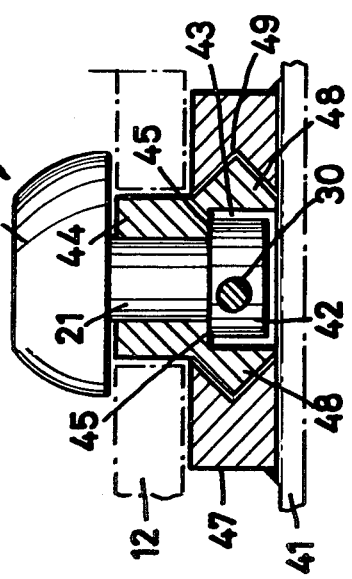
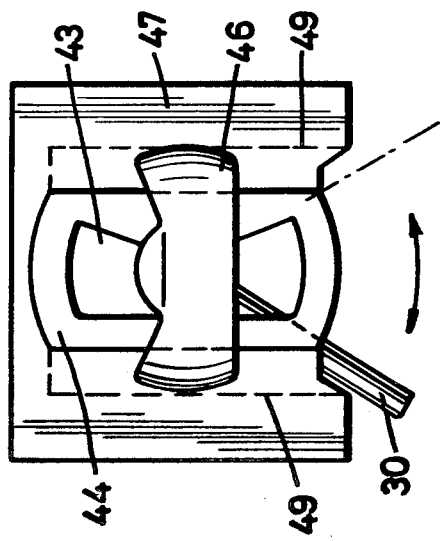

COUPLING DEVICE FOR CONTAINERS

This is a division of application Ser. No. 709,014, filed July 27, 1976. Application Ser. No 709,014 is now U.S. Pat. No. 4,082,052.

This invention relates to a coupling device for connecting containers or the like having corner fittings formed with slots, the device comprising a casing for abutment by the corner fittings and a locking pin which is pivotably mounted in the casing and carries transversely extending bolts for insertion in the corner fittings.

Coupling devices of the kind specified are mainly used for interconnecting containers stacked, for instance, one upon the other on the deck of a ship. The object is to connect each pair of superimposed corner fittings of superadjacent containers, and also to anchor the lower corner fittings of the lower containers to the deck of the ship.

Coupling devices of the kind specified must be robustly constructed and simple to manufacture and handle.

The coupling devices hitherto mainly used in practice have a one-part locking pin provided with hammer-head bolts. The casing in which the locking pin is pivotably mounted comprises two casing halves which are fixed together around the locking pin by fasteners such as screws. Ratchet mechanisms inside the casing determine the pivotal end positions of the locking pin, which can be pivoted by an actuating lever. A coupling device of this kind is expensive to manufacture and in handling will often not stand up to the heavy loads imposed by operations carried out on ships.

It is an object of the invention to provide a coupling device which is simpler in construction, more robust in operation and can be more readily used.

Accordingly, the present invention provides a coupling device for connecting containers or the like having corner fittings formed with slots, the device comprising a casing for abutment by the corner fittings and a locking pin which is pivotably mounted in the casing and carries transversely extending bolts for insertion in the corner fittings, in which device the casing is of one-part construction and is formed with an aperture for receiving the locking pin, such aperture being so constructed that at least one of the bolts can be introduced through the aperture in an assembly position and then retained against passing back through the aperture by being turned into a working position.

In the coupling device according to the invention, therefore, the casing and locking pin with the bolts disposed at its ends, each constitute unitary parts. However, to simplify assembly, at least one of the bolts is so constructed that it can be passed through the matchingly shaped aperture in the casing. In the working position, in which the locking pin can be pivoted between the locking and unlocking positions, the bolt is secured against passing through the adjacent aperture in the casing by a relative position in which it does not register with the casing aperture.

The end positions of the locking pin in the working position are ensured by a radially compressible resilient member which preferably comprises a coil spring mounted on an actuating lever connected to the locking pin. The coil spring is of such dimensions that before the end positions of the actuating lever are reached, the spring is moved away over projections, accompanied by radial compression. The radially compression resilient member is simple in construction and can readily be mounted. No extra machining of the casing or locking pin is required.

The coupling device of the invention may also be used for anchoring a container on the deck of a ship or the like. In this case one of the bolts of the locking pin is anchored in the casing which is releasably anchored in a matching retaining member mounted on the deck of the ship.

In order that the invention may be readily understood, embodiments thereof will now be described, by way of example, with reference to the accompanying drawings, in which.

Figure 1:
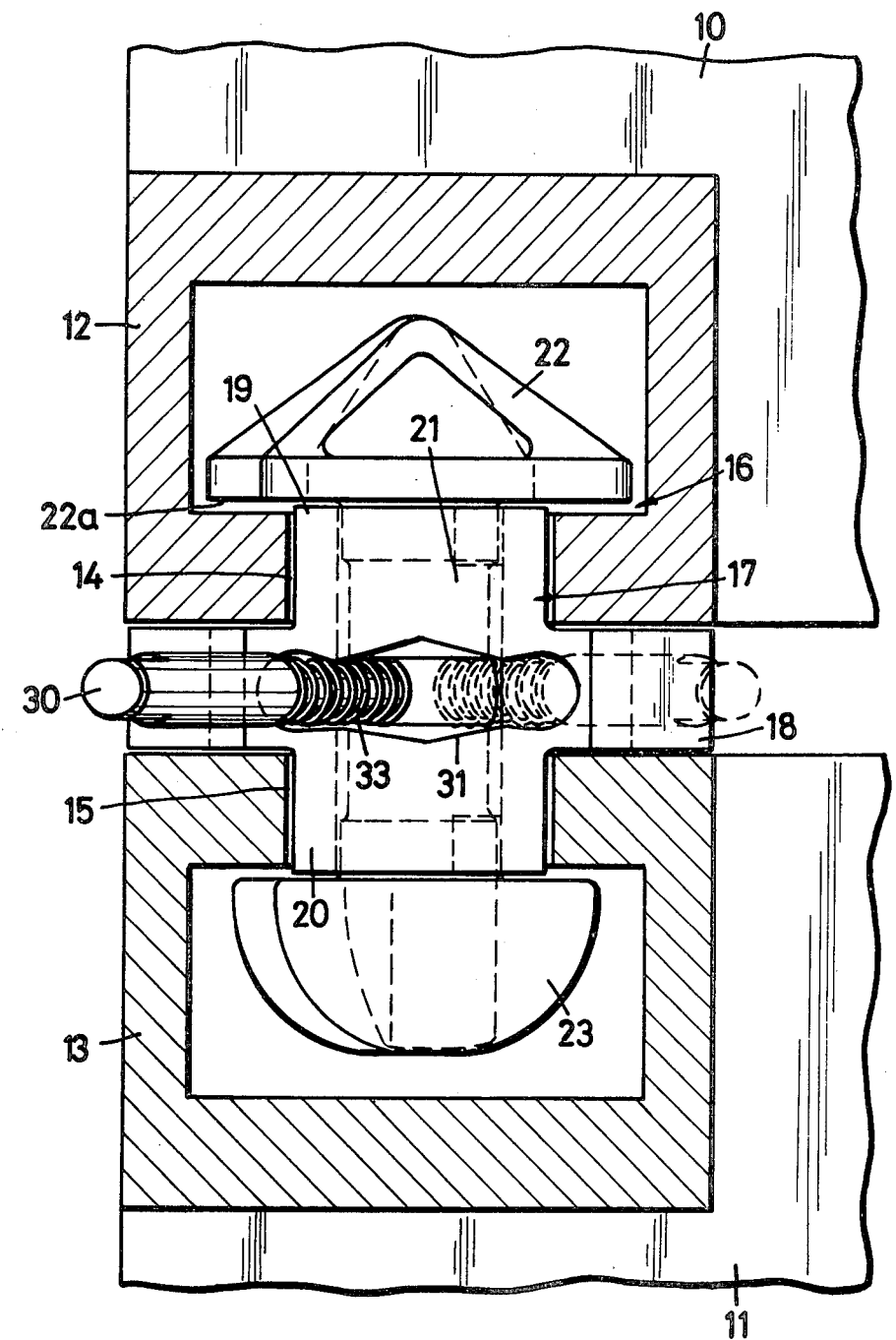
FIG. 1 is a side elevation of a coupling device embodying the invention in the mounted condition, the corner fittings of the containers being shown in section.
Figure 2:
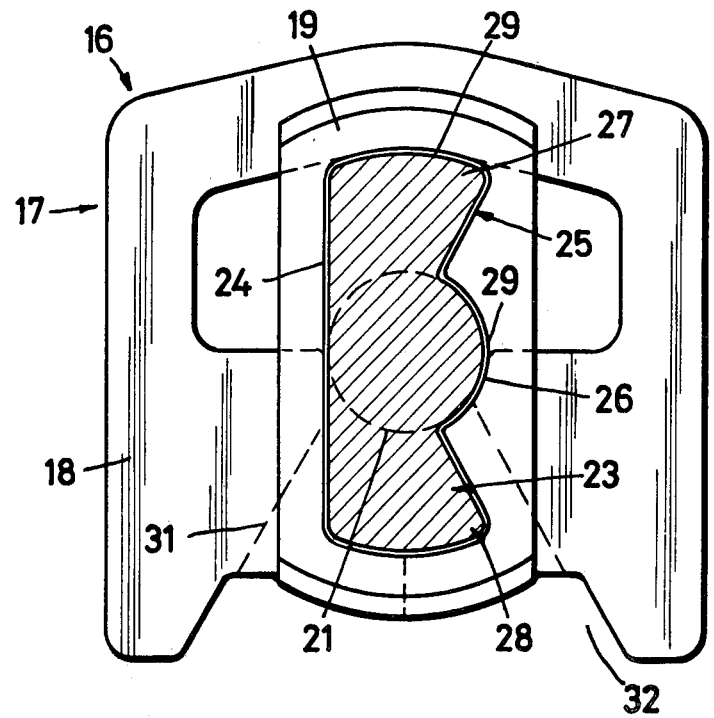
FIG. 2 shows the coupling device in plan, with a horizontal section through the specially constructed bolt in the assembly position.
Figure 4:
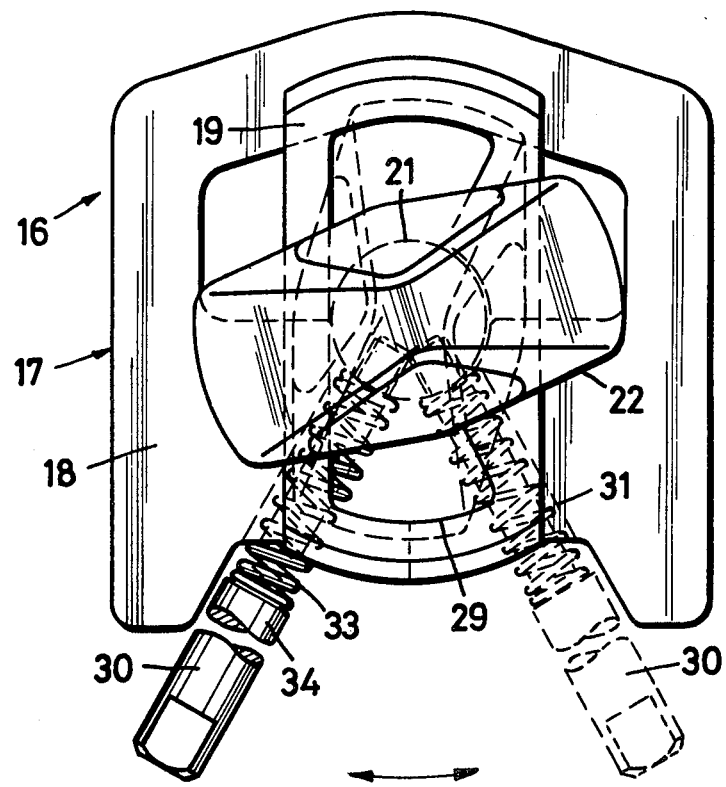
Figure 5:
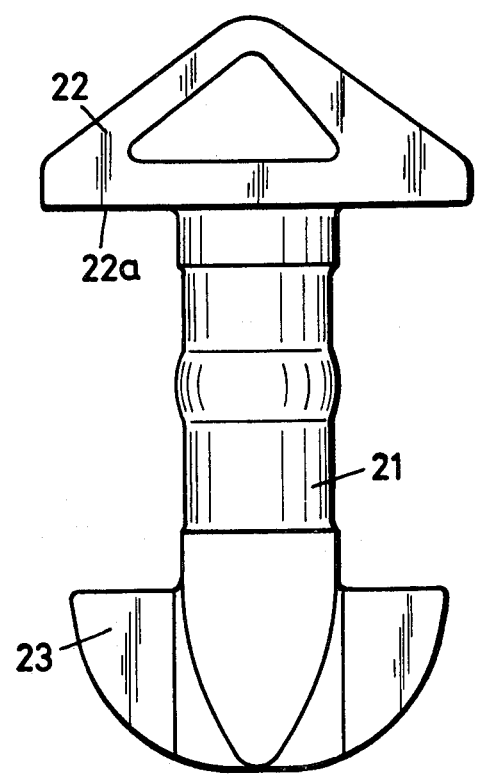
Figure 6:
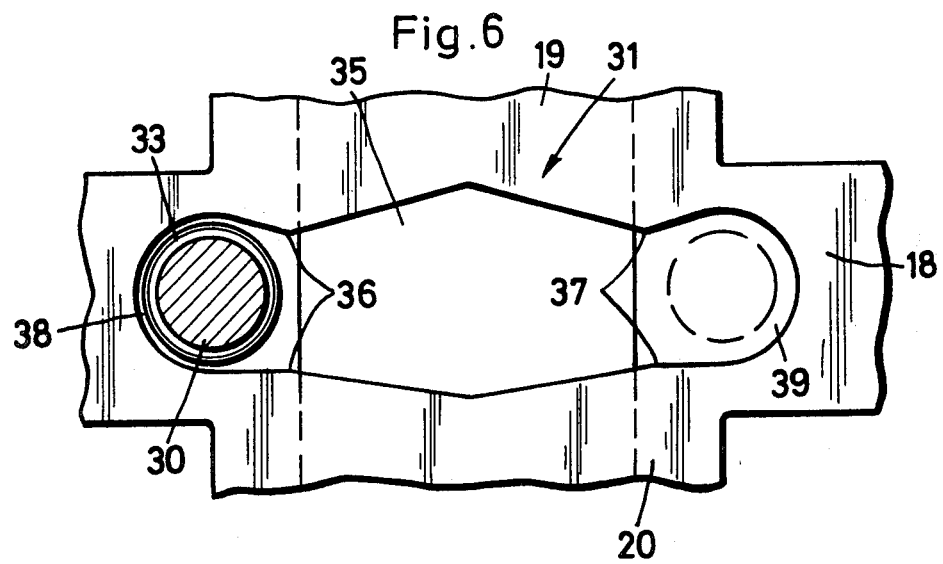

FIG. 3 corresponds to FIG. 2 and shows the bolt in the working position;

FIG. 4 is a view of the coupling device (plan) from the opposite side to FIGS. 2 and 3, showing the end positions of the working position;

FIG. 5 is a side elevation of the locking pin and its bolts;

FIG. 6 is a view to an enlarged scale of a detail of the casing, namely the slide for the actuating lever;

FIG. 7 is a partly vertically sectioned view of an embodiment of the coupling device which can be mounted on the deck of a ship;

FIG. 8 is a side elevation of the coupling device illustrated in FIG. 7, offset by 90°; and FIG. 9 is a diagrammatic plan of the embodiment illustrated in FIGS. 7 and 8.

The main object is to interconnect two containers 10, 11 stacked one above the other. Conventionally constructed corner fittings 12, 13 of the containers are so disposed one above the other that extensive downwardly and upwardly facing slots 14, 15 of the corner fittings are substantially in alignment with one another.

In the construction illustrated in FIGS. 1 to 6, the containers 10, 11 and their corner fittings 12, 13 are interconnected via a coupling device 16 comprising two individual unitary parts. One of the parts is a casing 17 consisting of a substantially central plate-shaped abutment 18 from which upwardly and downwardly extending central members 19, 20 project. The aforementioned abutment and members form a unitary part, preferably produced by metal casting. The central members 19, 20 extend with a varying degree of fit through the slots 14, 15 into the corner fittings 12, 13.

Pivotably mounted in the casing 17 is a locking pin 21 forming the other unitary part of the coupling device. The ends of the locking pin 21 project from the casing 17, namely from the cnetral members 19, 20, and each end of the pin 21 carries a respective bolt hammer head 22, 23. The pin 21 is shown as a detail in FIG. 5. In a working position thereof the locking pin 21 can be pivoted substantially through a range of 60° between a locking position (solid lines in FIG. 4) and an unlocking position (chain lines). In the locking position, the bolts 22, 23 are directed substantially transversely of the slots 14, 15, while in the unlocking position the bolts lie within the cross-sectional area of the slots 14, 15. In the last-mentioned position the containers 10, 11 can be lifted off one another and the coupling device 16 released from the corner fittings 12, 13.

The casing 17 and the locking pin 21 with its bolts 22, 23 are assembled by passing the locking pin through an aperture 29 in the casing. To this end one of the bolts, in the present case the bolt 23 (FIG. 1), is constructed as shown in plan in FIGS. 2 and 3. The bolt 23 is constructed with a smooth and flat lateral surface 24 directed substantially tangentially to the locking pin 21. The opposite lateral surface 25 has projections and depressions, namely a central projection 26 in the form of a convexity 26 corresponding to the outline of the locking pin 21, and outwardly oblique surface portions or wedge-shaped projections 27, 28. A depression in the aperture 29, corresponding to the convexity 26, at the same time forms a bearing-like guide for the locking pin 21.

The cross-section of the aperture 29 extending through the abutment 18 and the central members 19, 20 matches the outline of the bolt 23, the aperture 29 being slightly larger than the cross-section of the bolt 23. With a registering relative position between the bolt 23 and the aperture 29, the former can be passed through the aperture 29 in the casing 17. This is the assembly position, illustrated in FIG. 2, for the locking pin 21 with its bolts 22, 23.

The locking pin 21 and casing 17 are assembled in the aforedescribed manner. Then the locking pin 21 and therefore the bolts 22, 23 are turned from the assembly position into a working position (FIG. 3), by turning them through about 180°. The relative position between the bolt 23 and aperture 29 is then such that the convexity 26 and projections 27, 28 bear against the casing 17, namely against the adjoining end face of the central member 20. The whole locking pin 21 is therefore secured against demounting in the working position.

The bolt 22 is constructed in conventional manner, namely with a bearing surface 22a which is larger than the cross-section area of the aperture 29. When viewed laterally, the bolt 22 has a substantially rectangular shape, while the bolt 23 is arcuate when viewed laterally, to increase its strength.

The end positions of the range of movement of the locking pin 21 in the working position corresponds to the unlocking positions. To this end a, for instance, manually operable actuating lever 30 is releasably secured, for instance, by screwthreading, to the locking pin 21. The actuating lever 30 extends through a slide aperture 31 formed in the casing 17 in the region of the abutment 18, which has an indentation 32 at this place.

FIG. 4 shows the end positions of the actuating lever 30 and therefore of the locking pin 21 with bolts 22, 23. The actuating lever 30 is releasably latched in its end positions to prevent any accidental change in the particular end position. For this purpose a coil spring or radially compressible resilient member 33 is placed on the actuating lever 30. The spring 33 bears at one end against the locking pin 21 and at its other end against an enlarged portion 34 of the actuating lever 30.

In the end positions of the actuating lever 30, the coil spring 33 forms a catch by radial pressure and resulting deformation. To this end, the slide aperture 31 is formed as shown in FIG. 6. A widened central portion 35 of the aperture 31 is so dimensioned transversely and in height that the actuating lever 30, including the coil spring 33, can move freely when in the central region of the aperture 31. At a distance from the end positions the slide aperture 31 is so narrowed by projections 36, 37 that the remaining gap ensures that the actuating lever 30, including the coil spring 33, can pass through, accompanied by the radial compression of the spring 33. After passing the projections 36, 37, accompanied by the resilient deformation of the coil spring 33, the actuating lever 30 arrives in a stable, unloaded end position determined by correspondingly dimensioned end zones 38, 39 of the slide aperture 31. The radially compressible resilient member or coil spring 33 conprises a radially compressible resilient member which concentrically surrounds the actuation lever 30 and is positioned within the slide aperture 31 so that it is radially compressed during passing of projections 36, 37.

FIGS. 7 to 9 illustrate a modified embodiment of a coupling device 40. The coupling device is intended more particularly for the locking of containers on a deck 41 of a ship or the like.

In this case the locking pin 21 has at the bottom end a transverse bolt 42 disposed in a recess 43 in an elongate casing 44. The recess 43,, which extends over the whole height of the elongate casing 44, has an upper portion, namely in the region of the locking pin 21, which is formed with the cross-sectional shape of the aperture 29 in the embodiment of FIGS. 1 to 6. A lower enlarged portion of the recess 43 forms bearing surfaces 45 for the transverse bolt 42. A bolt 46, disposed outside the casing 44 for insertion in the corner fitting 12 of a container (not shown) is constructed in the same manner as the bolt 23 in FIG. 1—i.e., it corresponds to the shape of the recess 43.

Basically the locking pin 21 with the unitary transverse bolt 42 and the bolt 46 is mounted in the same way as disclosed hereinbefore. In an assembly position, in which the bolt 46 registers with the recess 43, the bolt 46 is passed through the recess 43 and turned into the working position illustrated in FIGS. 7 and 9. The result is the same relative positions as in the previous embodiment. To actuate the locking pin 21 an actuating lever 30 is disposed on the transverse bolt 42.

The casing 44 is releasably mounted on the deck 41 of the ship. To this end a matching retaining member 47, substantially U-shaped in plan, is mounted on the deck 41. The casing 44 is releasably introduced into the matching retaining member 47, in this case by insertion in a plane parallel with the deck 41 from the open side of the matching retaining member 47. The casing 44 has lateral guides, for instance, guide strips 48 of triangular cross-section. The guide strips 48 fit positively into correspondingly constructed guide grooves 49 in the matching retaining member 47. The relative position is such that the actuating lever 30 lies in the region of the open side of the matching retaining member 47. As a result there is a zone in which the actuating lever 30 can pivot in the working position. The guide strips 48 and correspondingly the guide grooves 49 can also have some other cross-sectional shape, for instance, be semicircular.

What we claim is:
1. In a coupling device for connecting at least one member to a casing adjacent thereto, said casing carrying a rotatable locking pin and said pin including a portion, which when rotated to a first position, locks said member to said casing, and when rotated to a second position, unlocks said member from said casing, and an actuating lever fixed to the locking pin and movable therewith to define the region of movement between said first and second positions corresponding to locking and unlocking of said member, the improvement com- prising: a radially compressible resilient member concentrically disposed on said actuating lever, and fixed projections on opposite saids of said lever at at least one point along the path of movement of said lever and said radially compressible resilient member between said first and second positions, and defining a gap smaller in diameter than the diameter of said radially compressible resilient member when in its radially expanded state, said radially compressible resilient member passing between said fixed projections as said lever is shifted between said first and second positions such that said radially compressible resilient member is compressed radially during passage between said projections and subsequently relaxed after passage therethrough for latching said actuating lever selectively in at least one of said first or second positions.

2. The coupling device as claimed in claim 1, wherein said radially compressible resilient member comprises a coil spring mounted on said actuating lever to latch the actuating lever in either said first and said second position to said casing.

3. The coupling device according to claim 2, wherein said fixed projections comprises spaced pairs of laterally opposed projections, said casing is formed with a slide aperture, said actuating lever and said coil spring passing through said slide aperture, said slide aperture being narrowed intermediate of the first and second positions of the actuating lever and forming two pairs of said projections such that said actuating lever is movable into an enlarged zone to respective sides thereof remote from each other corresponding to said first and second positions, accompanied by compression of the coil spring carried by said lever during passage between said projections.

4. The coupling device according to claim 3, wherein said coil spring bears at one end against the locking pin and the other end against an enlarged portion of said actuating lever.

5. The coupling device as claimed in claim 1, wherein said one member comprises a fitting having a slot within a face thereof, said casing is in abutment with said fitting and overlying said slot, said locking pin includes at least at one end an integral hammer head bolt, said casing includes a longitudinal opening which rotatably carries said bolt with said bolt being lockable within said slot to said fitting by rotating said bolt to overlie a portion of said fitting adjacent said slot, said casing is of one part construction, said opening comprises a continuous aperture and said aperture is so disposed in a cross-section such that said bolt can be introduced through said casing apertuer and rotated to a working position to effect assembly of said locking pin and casing and said casing further comprises means for limiting bolt rotation to said first and second positions after rotation to the working position which respectively effects locking of said fitting to said casing and release of said fitting from said casing while preventing said bolt from passing back through said casing aperture.

6. The coupling device as claimed in claim 5, wherein said bolt and said aperture and said casing have convexities and projections which register in the assembly position of the bolt, but which are unaligned in the working position to cause the bolt to bear against the casing.

7. The coupling device as claimed in claim 6, wherein said bolt has on one side an arcuate convexity formed by said locking bolt and lateral substantially triangular projections, the corresponding side of said casing aperture having a depression guiding said bolt, and said bolt and said casing aperture being formed with smooth surfaces on the opposite side.

* * * * *